United States Patent [19]

Bender

[11] Patent Number: 5,577,317
[45] Date of Patent: Nov. 26, 1996

[54] CRIMPING APPARATUS EMPLOYING A BRAKING WINDING

[75] Inventor: Jürgen F. C. Bender, Angelbachtal, Germany

[73] Assignee: Bernhard Schäfer Werkzeug-und Sondermaschinen GmbH, Germany

[21] Appl. No.: 366,266

[22] Filed: Dec. 29, 1994

[30] Foreign Application Priority Data

Dec. 31, 1993 [DE] Germany .................. 43 45 039.3

[51] Int. Cl.⁶ ..................................................... B23P 19/00
[52] U.S. Cl. ........................................... 29/753; 310/103
[58] Field of Search .................... 318/362, 370, 318/760, 777; 29/753; 310/103, 105, 106, 107

[56] References Cited

U.S. PATENT DOCUMENTS 4,970,421  11/1990  Kritzinger .......................... 310/217

FOREIGN PATENT DOCUMENTS 4307357  9/1994  Germany .......................... 318/362

Primary Examiner—P. W. Echols
Attorney, Agent, or Firm—Bachman & LaPointe, P.C.

[57] ABSTRACT

An apparatus for connecting a wire to a contact element by deformation of clamping members by means of pressure members of a crimping tool arranged in a press has a single-phase ac motor (82) as its drive motor, which has an additional independent braking winding (96) which can be supplied with a braking voltage. That provides for accurate positioning which is reliable in a continuous mode of operation, while affording a compact structural size.

9 Claims, 6 Drawing Sheets

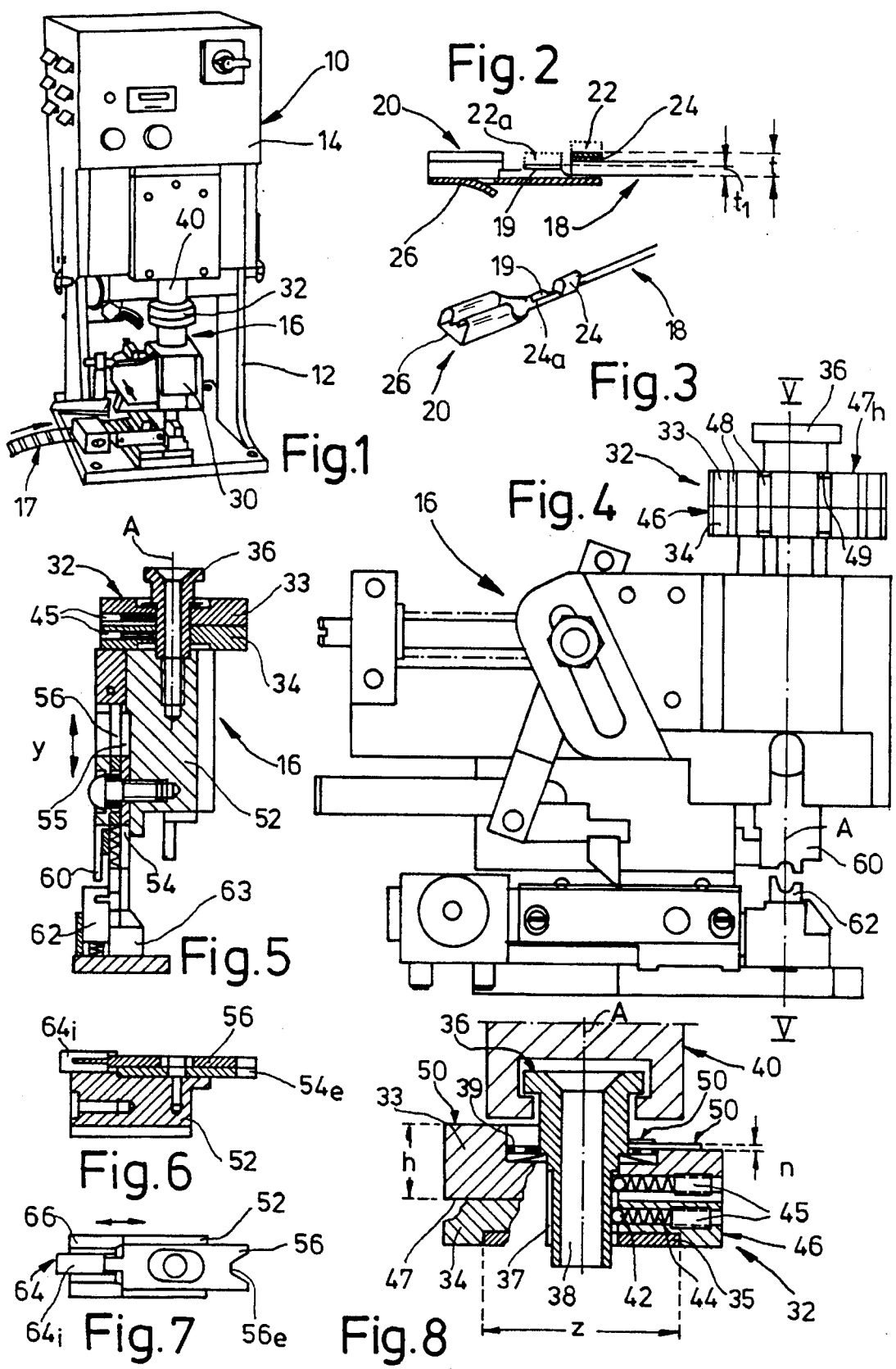

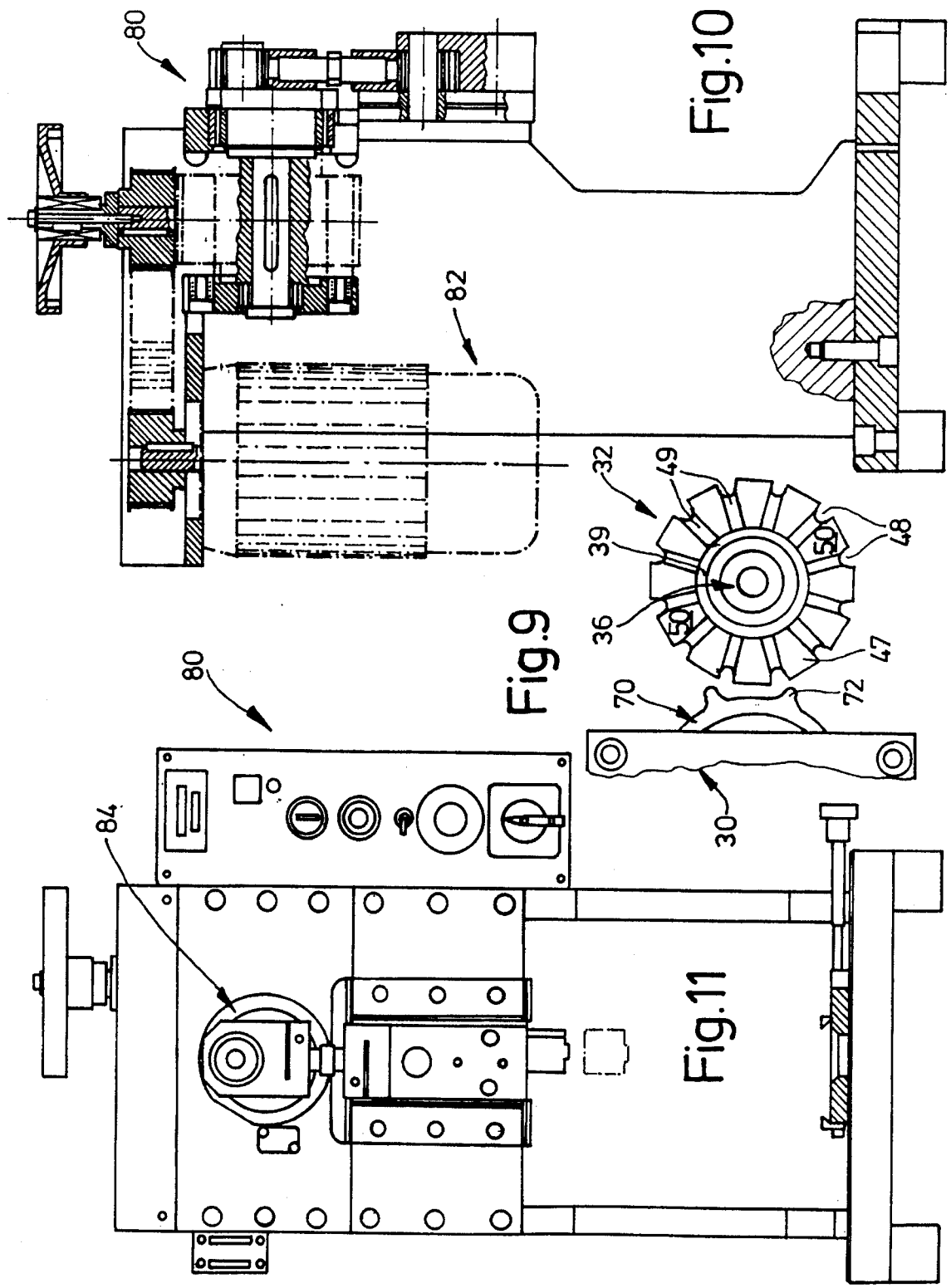

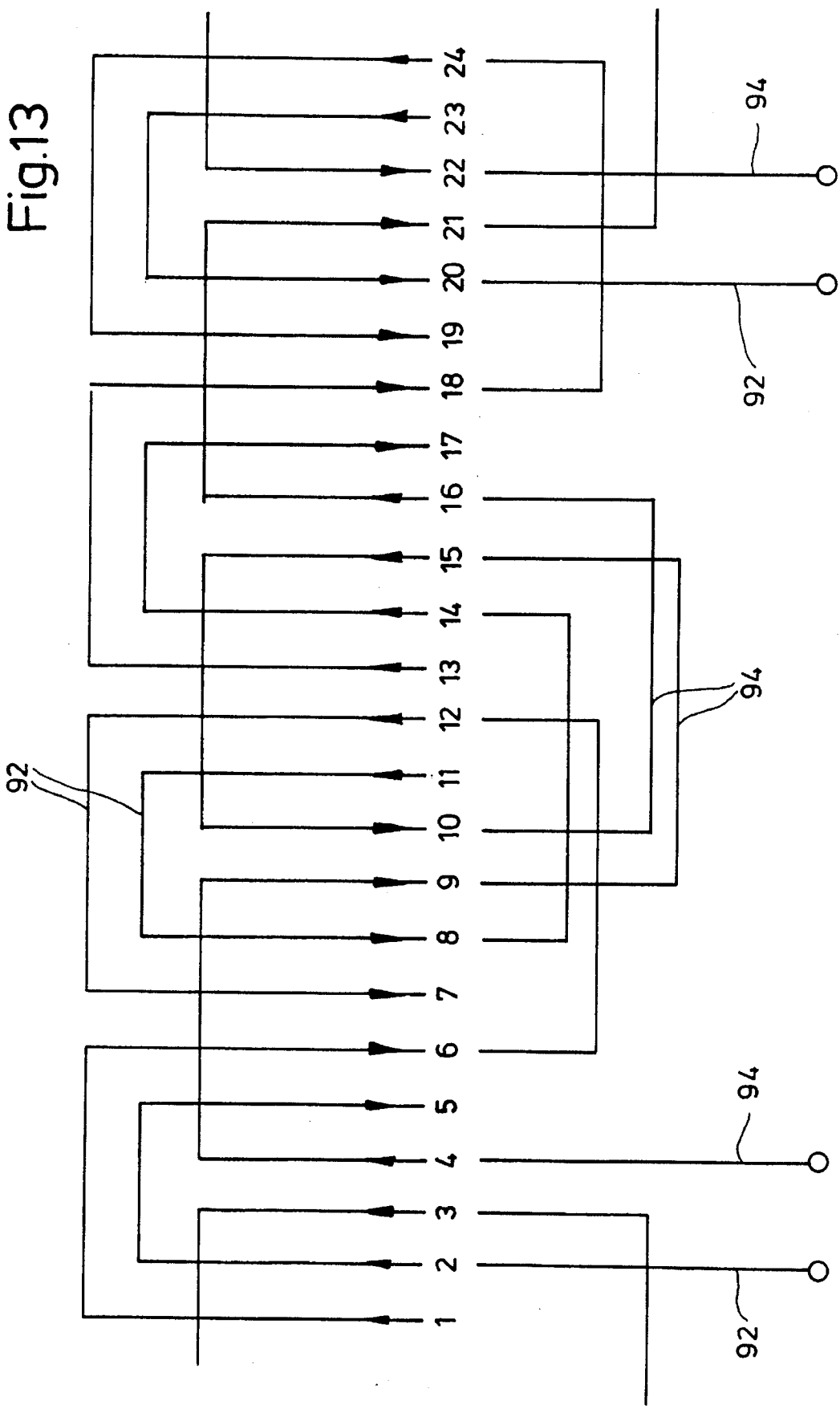

CRIMPING APPARATUS EMPLOYING A BRAKING WINDING

BACKGROUND OF THE INVENTION

The present invention concerns an apparatus for connecting a wire to a contact element and a method of operating such an apparatus.

An apparatus of that kind is known for example from the present applicants' German patent specification No 40 39 051. Such crimping tools, but also other situations of use, require drive means which, in the cycle consisting of starting, crimping and braking, can initiate braking operations in particular in a very short time.

Usually such a braking procedure is effected mechanically. However, particularly in the case of apparatuses which are operated in a continuous mode, that results in severe wear and thus has a detrimental effect on the useful life.

In addition it would be theoretically possible for the drive motor to be braked by operating in a generator mode. It will be noted that if the drive motor used is an asynchronous machine, the arrangement must provide for direct-current excitation by feeding a direct current into the working winding so that a braking effect occurs. As however the braking current which is required for that purpose is high and as there is not a sufficient cooling time due to the high cycle rate of the crimping apparatus, there is the risk of the motor burning out. For that reason alone generator-mode braking has hitherto not been adopted.

In addition however such a braking procedure would also suffer from the disadvantage of inadequate positional accuracy which makes it unsuitable for use in crimping apparatuses: as a, usually single-phase, asynchronous motor has an elliptical rotating field and thus the magnetic flux fluctuates in the direction of rotation, the field is not suitable for a braking mode which gives accurate positioning. On the contrary that could result in overrunning on the part of the apparatus in question, or another inaccurate braking performance.

SUMMARY OF THE INVENTION

The object of the present invent ion is therefore that of improving the braking performance of apparatuses of the general kind set forth for cyclic operation and in particular making the drives more exact and more reliable.

That object is attained by the apparatus of the present invention and the method of operation of the present invention.

Supplying the braking winding with the braking voltage advantageously gives rise to a uniform and reproducible magnetic induction effect which results in an accurate braking characteristic.

In addition the independent braking winding permits the use of other suitable wire thicknesses and winding lengths so that a higher level of current consumption is managed and thermal problems are avoided.

Thus a constant braking position is achieved over a prolonged period of time, in particular also in a continuous mode of operation and when a rise in temperature occurs, and at the same time braking is effected in a wear-free manner.

The invention affords an additional advantage by virtue of a braking mode which involves a low level of noise, as there are no mechanical parts that are moved.

Advantageous developments of the invention are described in the following specification.

Thus, in accordance with a preferred development, the drive motor is in the form of a squirrel-cage rotor. That permits a simple and strong structure.

In accordance with a further preferred development the apparatus is provided with means for short-circuiting the working and the auxiliary windings. That produces an additional braking moment by induction, and that additional braking moment increases the braking effect.

In accordance with a further preferred development the braking winding is formed in the bottom of grooves in the stator. That means that the motor is of a smaller configuration and affords overall a more compact unit. That also avoids additional expenditure for additional grooves for the braking winding.

In accordance with a further preferred development the braking voltage which flows in the braking winding is externally controllable. In that way the braking moment and therewith the braking time can be controlled by adjustment of the voltage involved.

BRIEF DESCRIPTION OF THE DRAWINGS

Further advantages, features and details of the invention are apparent from the following description of preferred embodiments and with reference to the drawing in which:

FIG. 1 is a perspective view of an apparatus with a crimping tool in an impact press for connecting contact elements to wires, FIG. 2 shows a view in longitudinal section through a wire with associated contact element, FIG. 3 is a perspective view of FIG. 2, FIG. 4 is a front view of a crimping tool with adjusting disks, FIG. 5 is a partial view on a reduced scale in section through the crimping tool shown in FIG. 4, sectioned approximately along line V—V therein, FIG. 6 is a detail from FIG. 5 with crimping punches, shown in a lying position (pivoted through 90°), FIG. 7 is a plan view of the detail shown in FIG. 6, FIG. 8 shows the partially sectioned adjusting disk in cross-section on an enlarged scale, FIG. 9 shows a plan view on an enlarged scale onto a part of FIG. 1 with associated adjusting disk in the working position, FIG. 10 is a side view of a crimping tool with ac motor as a drive, FIG. 11 is a front view of the FIG. 10 structure, FIG. 13 is a diagrammatic winding diagram of the working and the auxiliary winding on the stator.

DETAILED DESCRIPTION OF PREFERRED EMBODIMENTS

Figure 12:
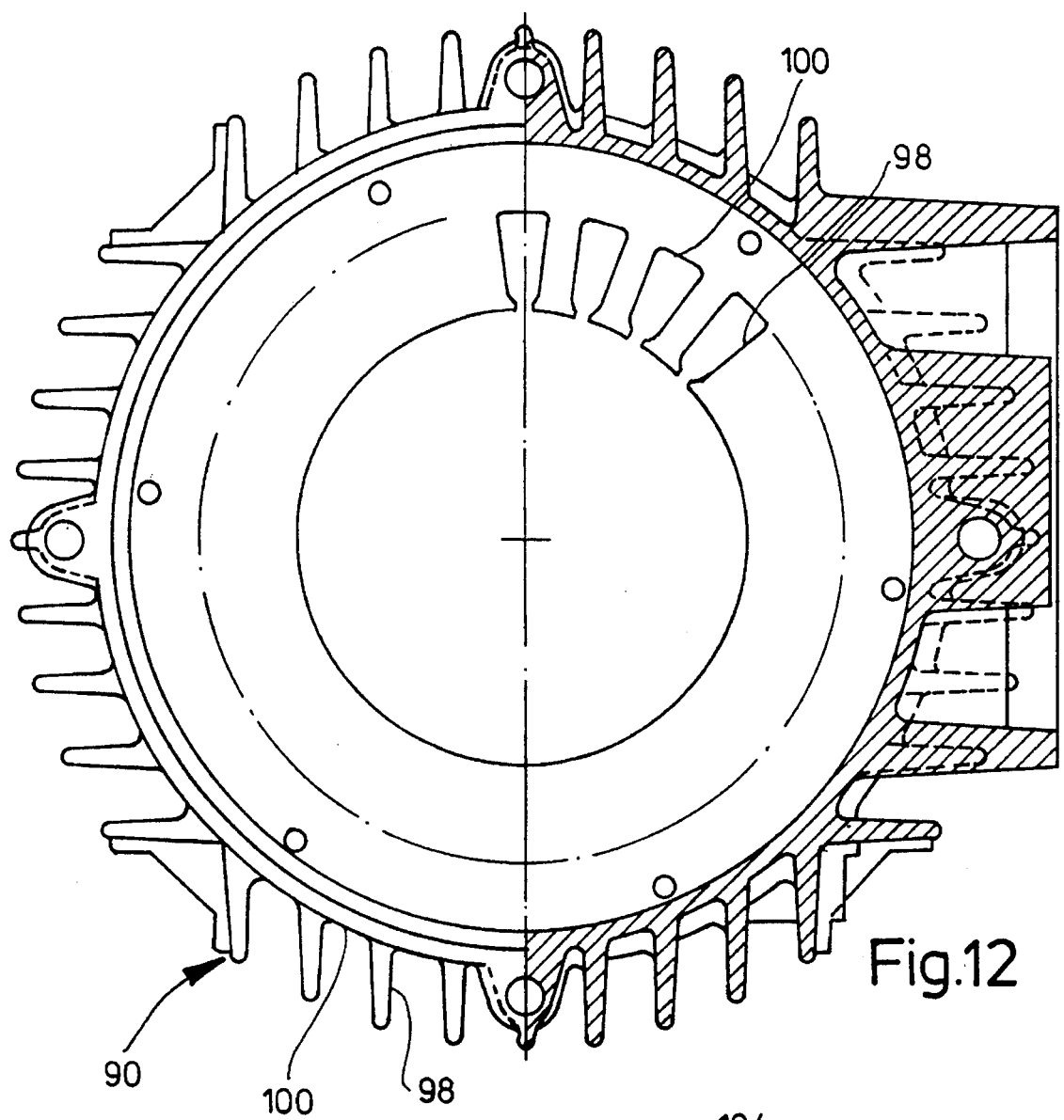
FIG. 12 is a view in cross-section of the stator.

Referring to FIG. 1 an impact press 10 for processing wires or cables of up to 6 mm² line cross-section has, below a press housing 14 which contains control and pressure devices and which is disposed on support structure legs 12, a quick-change crimping tool 16 for connecting an insulated electrical wire 18 to a plug, contact element 20 or the like, which is separated from a sheet metal strip 17 or line of blanks.

In the embodiment shown in FIGS. 2 and 3, lugs which are indicated in broken line at 22 and 22a respectively are pressed or crimped onto and enclose the wire end 19 which has been previously stripped of insulation and the adjoining insulated wire 18, being subjected to deformation to form sleeve-like clamping portions 24 and $24_a$, the upper edges thereof being disposed relative to the bottom 26 of the component at different spacings as indicated at t (insulation region) and $t_1$ (wire end region) (FIG. 2). In the crimping operation the lugs 22 and $22_a$ are rolled in so firmly that for example the wire strands of the wire end 19 flow and air inclusions are prevented.

The so-called crimping heights t, $t_l$ must be adjustable in order to be able to adapt the effect of the deformation produced to the respective cross-section of the wire.

The device for adjusting the crimping height basically comprises two units, namely a guide portion 30 which is controlled by pneumatic and motor means and which is fixed to the press 10 and a portion which is to be adjusted and which is associated with the guide portion 30. The portion to be adjusted is an adjusting disk 32 which is rotatably mounted and screwed onto the crimping tool 16, having twelve different levels in respect of height in the illustrated embodiment.

As shown in FIGS. 5 and 8 the adjusting disk 32 at the tool side comprises an upper disk 33 and a lower disk 34 with a spacer plate 35, extending through all of which is a hollow arresting pin 36 with a shank 38 which decreases in size downwardly in steps and which affords twelve vertical longitudinal grooves 37. The shank 38 is surrounded by an inserted plate spring 39. The diameter z of the spacer plate 34, in this case 40 mm, is also selected to be of such a size that the pivot point of a pressing punch or ram which is indicated at 40 in FIG. 8 lies within that diameter z.

The longitudinal grooves 37 of the shank 38 serve for arrestingly receiving retaining balls 42 which, under the force of coil springs 44 acting thereon, rest movably in radial bores in the two disks 33 and 34, which radial bores can be closed by screwthreaded pins 45. It will be seen that the disks can be respectively fixed independently of each other in twelve different retaining positions relative to the axis A of the arresting pin 36, to select one of the twelve levels in respect of height.

Formed in the disk periphery 46, and starting from the underneath surface 47 of the disk, are twelve vertical engagement grooves 48 which continue in the upwardly directed disk top surface $47_h$, in the form of radial depressions 49. They subdivide the disk top surface $47_h$ into twelve sector faces 50 which, rising step-like in the counter-clockwise direction in the embodiment shown in FIG. 8, are at different spacings h relative to the underneath surface 47 of the disk. The step heights or the spacings in respect of height, in parallel relationship with the axis, as between adjacent sector faces 50 of about 0.05 mm to 0.1 mm are identified by n in FIG. 8 and are shown in exaggerated form for reasons of clarity.

FIGS. 4 and 5 show a part of the crimping tool 16 with the upwardly disposed adjusting disk 32 whose arresting pin 36 is carried in a pressing block 52 of the crimping tool 16. Disposed below the adjusting disk 32 are crimping punches 54 and 56 which extend parallel relationship and whose free lower edges $54_e$ and $56_e$ are associated with the wire end 19 and the insulation portion 18 respectively. The crimping punches 54, 56 are separated by way of the adjusting wheel members 33, 34 from the pressing punch 40 and by a spacer sleeve 55; the crimping punch 56 for the insulation portion 18 can be raised and lowered relative to the other crimping punch 54 as indicated by the arrow y in FIG. 5. At the left in front of the insulating crimping punch 56 FIG. 5 shows a pressing bar 60 for a blade 62 disposed therebeneath for severing the contact element 20 from the sheet metal strip 17. An anvil 63 can be seen in FIG. 5 beside the blade 62.

In FIGS. 6 and 7 reference 64 indicates a pressing surface which is rectangular in cross-section for the lower disk 34 with associated insulation crimping punch 56 while reference 66 denotes a pressing surface which is U-like in cross-section for the wire crimping punch 54. Displaceable in the channel profile of the one pressing surface 66 is a bar $64_i$ of the other pressing surface 64.

It will be clear that both crimping punches 54, 56 can be acted upon by the upper disk 33 of the adjusting disk 32, but that the lower disk 34 adjusts the insulation crimping member 56 and therewith the difference in height between t and $t_1$ in FIG. 2.

Associated with the adjusting disk 32 is a control wheel 70 of the guide portion 30, with radial teeth 72 projecting from the periphery thereof; the control wheel 70 also comprises an upper wheel and a lower wheel and it has its axis parallel to the axis A of the adjusting disk 32. The radial teeth 72 mesh in the working position with the engagement grooves 48 in the adjusting disk 32 and in the rest condition of the apparatus are disposed at a spacing relative to the adjusting disk 32.

An eccentric press 80 of a crimping tool as shown in FIGS. 10 and 11 is provided with an ac motor 82 as its drive.

FIG. 11 shows the eccentric press 80 in the rest position; it is disposed at its upper dead center point (arrow 84). The direction of rotation e of an eccentric shaft which is indicated at 86 is in the clockwise direction. The braking cycle is initiated when a chord surface 87 provided on the eccentric shaft 86 passes and switches a switch 88. That procedure takes place before attainment of the top dead center point 84 as the braking cycle requires a certain amount of time.

The drive motor 82 according to the invention is in the form of a single-phase asynchronous squirrel-cage motor. It includes a 24-groove stator plate stack and a 30-groove rotor plate stack.

Figure 14:
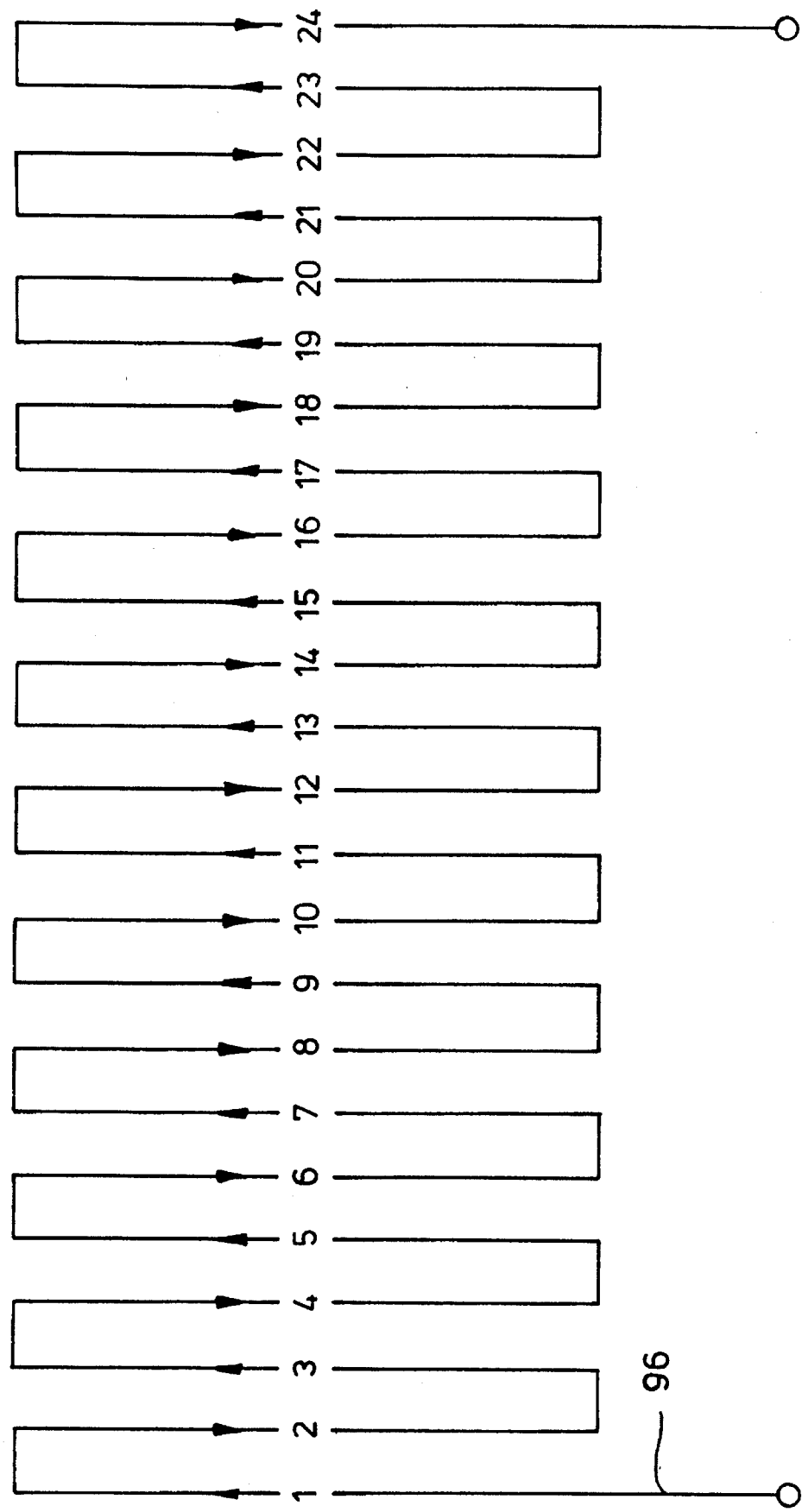
FIG. 14 shows a diagrammatic winding diagram of the braking winding on the stator.

FIG. 12 is a view in cross-section through the stator 90 while FIG. 13 diagrammatically shows the winding of the stator with the working winding 92 and the auxiliary winding 94 and FIG. 14 shows the winding of the stator with the braking winding 96.

Grooves 98 formed in the stator plates accommodate both the working and the auxiliary windings 92 and 94 and also—in the form of an endless coil, which therefore is wound around the periphery of the stator 90 into the grooves 98—the braking winding 96, in the groove bottom 100. In that way no additional grooves are required in the stator for the braking winding.

As the braking winding 96 is independent of the working and auxiliary windings 92, 94, it is possible to use a greater wire thickness which is suited to the higher braking current, for the braking winding, while the winding length can also be adapted in accordance with the thermal factors involved, without that influencing the actual operational windings.

Figure 15:
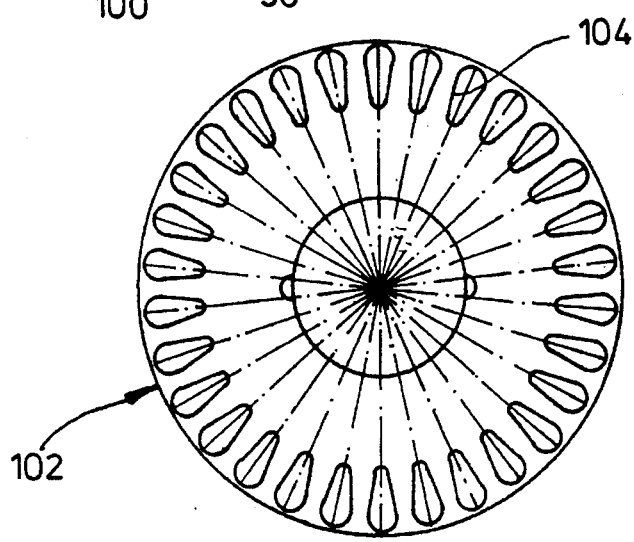
FIG. 15 is a view in cross-section of the rotor.

FIG. 15 is a view in cross-section through the rotor 102 which is formed from plates. Grooves 104 in the rotor plate stack are injected with an aluminum-silicon alloy ("Silumin") so that conductive rotor bars are formed. At both ends of the bars, a short-circuit ring is formed from the safe material, thereby affording the structure of a so-called squirrel-cage rotor.

For reasons of current displacement or skin effect the grooves 104 and therewith also the rotor bars are of a drop-like cross-sectional shape (taper bar).

Figure 16:
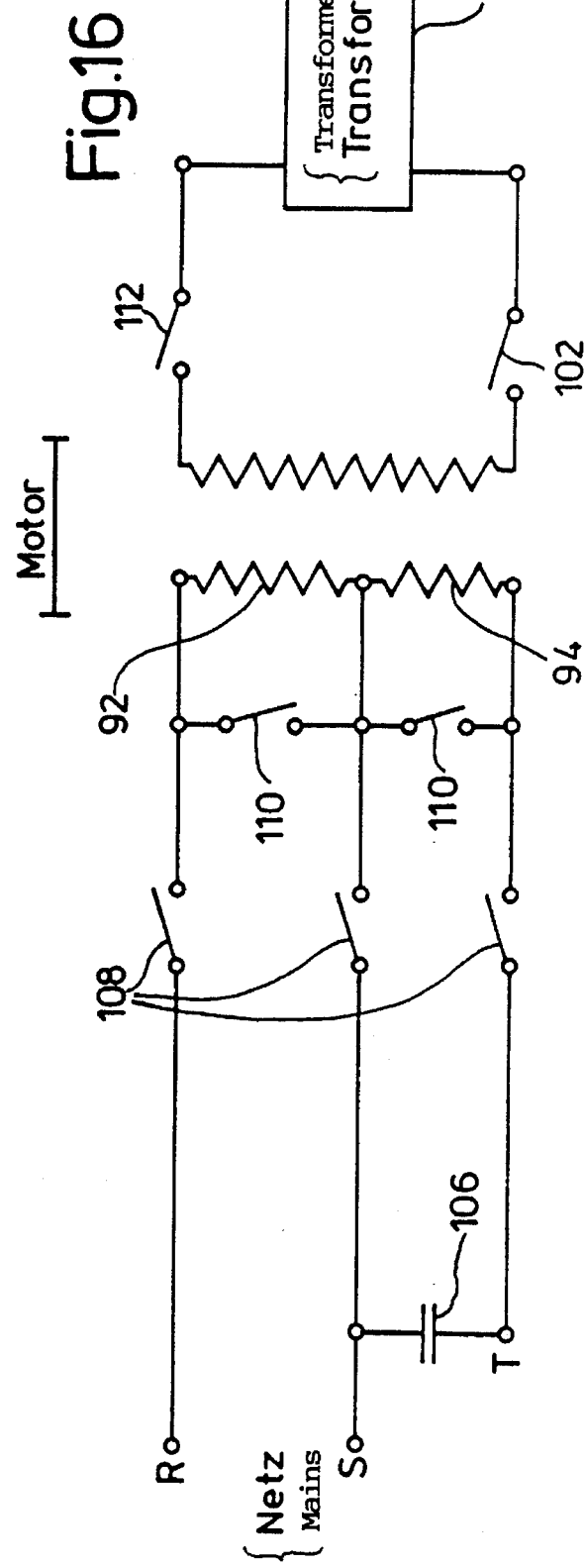
FIG. 16 is a circuit diagram showing the principle of the circuitry of the working, auxiliary and braking windings.

The individual windings of the drive motor are wired up as shown by the basic circuit diagram illustrated in FIG. 16: the working winding 92 is connected directly to the main voltage while the auxiliary winding 94 is connected in series by way of a capacitor 106.

A triple switching unit 108 is provided for simultaneously making and braking the connection between the winding terminals of the working and auxiliary windings 92, 94 and the main voltage. Additional switching units 110 are disposed across the working and the auxiliary windings 92, 94 for respectively forming a short-circuit between the terminals.

Finally the arrangement has a switching unit 112 for connecting the braking winding 96 to a dc voltage source which is in the form of a controllable transformer 114 with rectifier.

Figure 18:
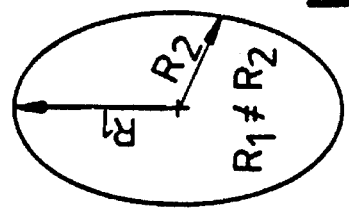
FIG. 18 shows a vector diagram of the rotating field of a single-phase motor.
Figure 17:
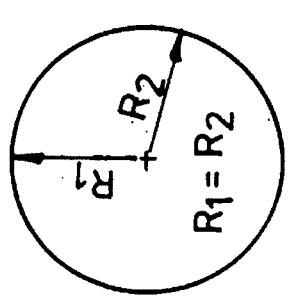
FIG. 17 shows a vector diagram of the rotating field of a three-phase machine.

When starting up and in operation the drive motor functions like a conventional single-phase motor. In contrast to a three-phase motor whose rotating field is substantially circular in the vector diagram as shown in FIG. 17 (R1=R2), the single-phase motor used in the present invention, by virtue of the main and the auxiliary windings, involves a rather elliptical rotating field (R1≠R2, see FIG. 18), with the consequence that the induced magnetic flux is not equal at every moment in time. However that property makes the particular rotating field of the single-phase motor unsuitable for use for braking purposes as the braking effect is different depending on the respective instantaneous position in the peripheral direction and thus the braking characteristic is imprecise and cannot be reproduced.

That problem is overcome by the independent braking winding which is completely separate from the other windings: at the beginning of the braking operation, that is to say when triggering off the braking cycle, the terminals of the working and auxiliary windings 92, 94 are separated from the main voltage by the switch 108 and adc voltage which is supplied from the transformer 114 is applied to the braking winding 96 by the switch 112. In that way, a multi-pole magnetic field is produced in the stator plate stack 90, which clears the plate stack 90 of the undefined elliptical rotating field (in which case the magnetic field produced by the dc voltage must be greater than the elliptical rotating field). A voltage is induced in the rotor which is still moving and a current flows through the rotor bars in the grooves 104 in the rotor, that current producing the braking moment in opposite relationship to the direction of rotation of the rotor.

Substantially simultaneously with the foregoing procedure the working and auxiliary windings are short-circuited by actuation of the switch 110. The rotor 102 through which current flows induces due to the short-circuit current in the working and auxiliary winding a voltage which generates an additional braking moment which acts in opposition to the direction of rotor rotation.

In that way the drive motor is decelerated to the speed of rotation of 0 with a short period of time and without wear, in which respect the braking moment and therewith the braking time is adjustable by virtue of suitable-preselection of the dc voltage which is applied to the braking winding. In practical use the braking time is in the region of 0.08 second.

The ac motor 82 affords a short starting time as only 0.04 second is available for the starting-crimping-braking cycle and about 4000 such cycles are to be performed per hour.

That gives an accurate braking position and in the case of the eccentric press 80 shown in FIG. 11 the rest position at the upper dead center point 84 as described above in relation thereto.

I claim:

1. Apparatus for connecting a wire to a contact element by deformation of clamping means by means of pressing members of a crimping tool, which comprises, a drive motor including a stator with a plurality of grooves having groove bottoms and an additional independent braking winding which can be supplied with a braking voltage, wherein said braking winding is formed in a groove bottom of said grooves of said stator.

2. The apparatus as set forth in claim 1, wherein said drive motor has a single-phase winding with a working winding and an auxiliary winding, and wherein said auxiliary winding is connected in series with a capacitor means.

3. The apparatus as set forth in claim 2, including means for a controlled short-circuiting of said working and auxiliary windings.

4. The apparatus as set forth in claim 2, including means for supplying said working and auxiliary windings with an operating voltage, means for applying a dc voltage to said braking winding and further comprising means for disconnecting said working and auxiliary windings from said operating voltage substantially simultaneously with an application of said dc voltage to said braking winding.

5. The apparatus as set forth in claim 4, further including means for short-circuiting said working and auxiliary windings substantially simultaneously with the application of said dc voltage to said braking winding.

6. The apparatus as set forth in claim 1, wherein said drive motor is in the form of a squirrel-cage motor with rotor bars formed in grooves of the rotor, and wherein said grooves are of a substantially drop-like cross-section.

7. The apparatus as set forth in claim 6, wherein said rotor bars are formed from an aluminum-silicon alloy.

8. The apparatus as set forth in claim 1, wherein said braking winding is provided as an endless winding.

9. The apparatus as set forth in claim 1, wherein said braking winding is connected to means for controlling said braking voltage.

* * * * *